R. R. LANGLEY.
PLANTING MACHINE.
APPLICATION FILED JULY 8, 1907. RENEWED DEC. 5, 1908.
927,555.
Patented July 13, 1909.
4 SHEETS—SHEET 3.
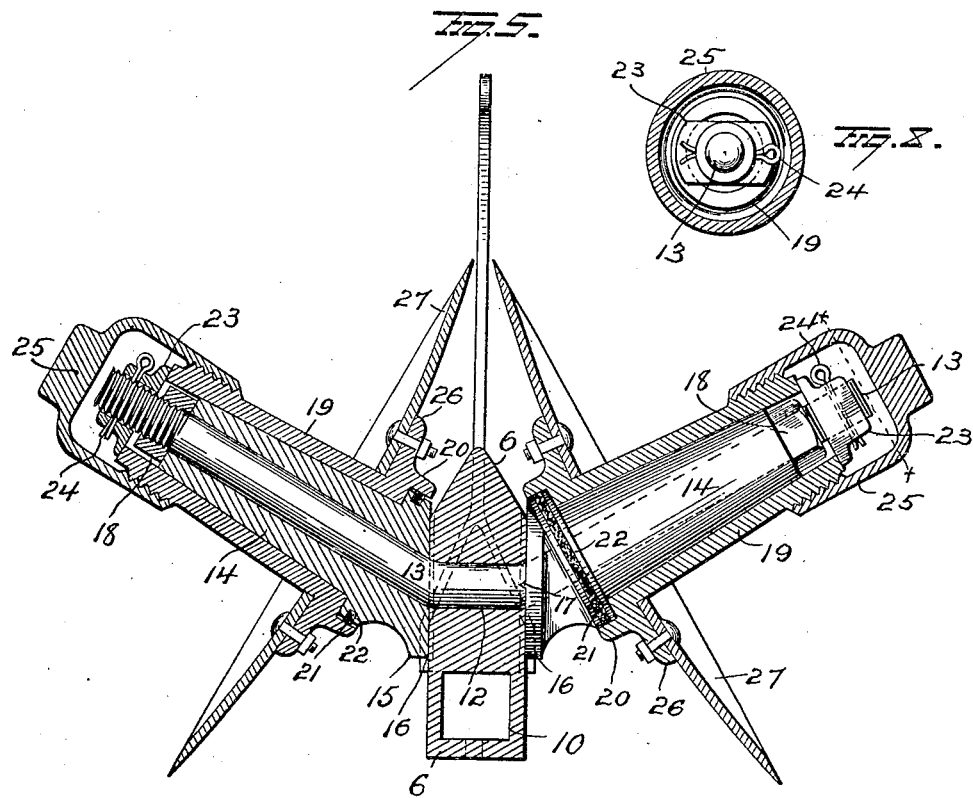
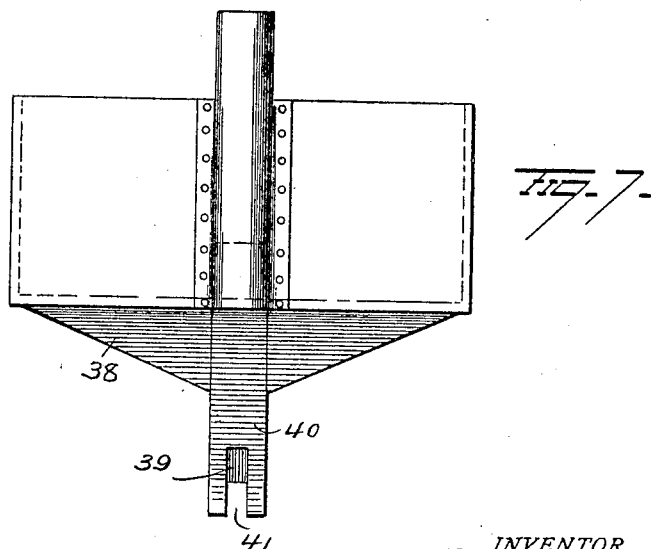
WITNESSES
E. Nottingham
G. F. Downing
INVENTOR
R. R. Langley
By H. A. Seymour
Attorney

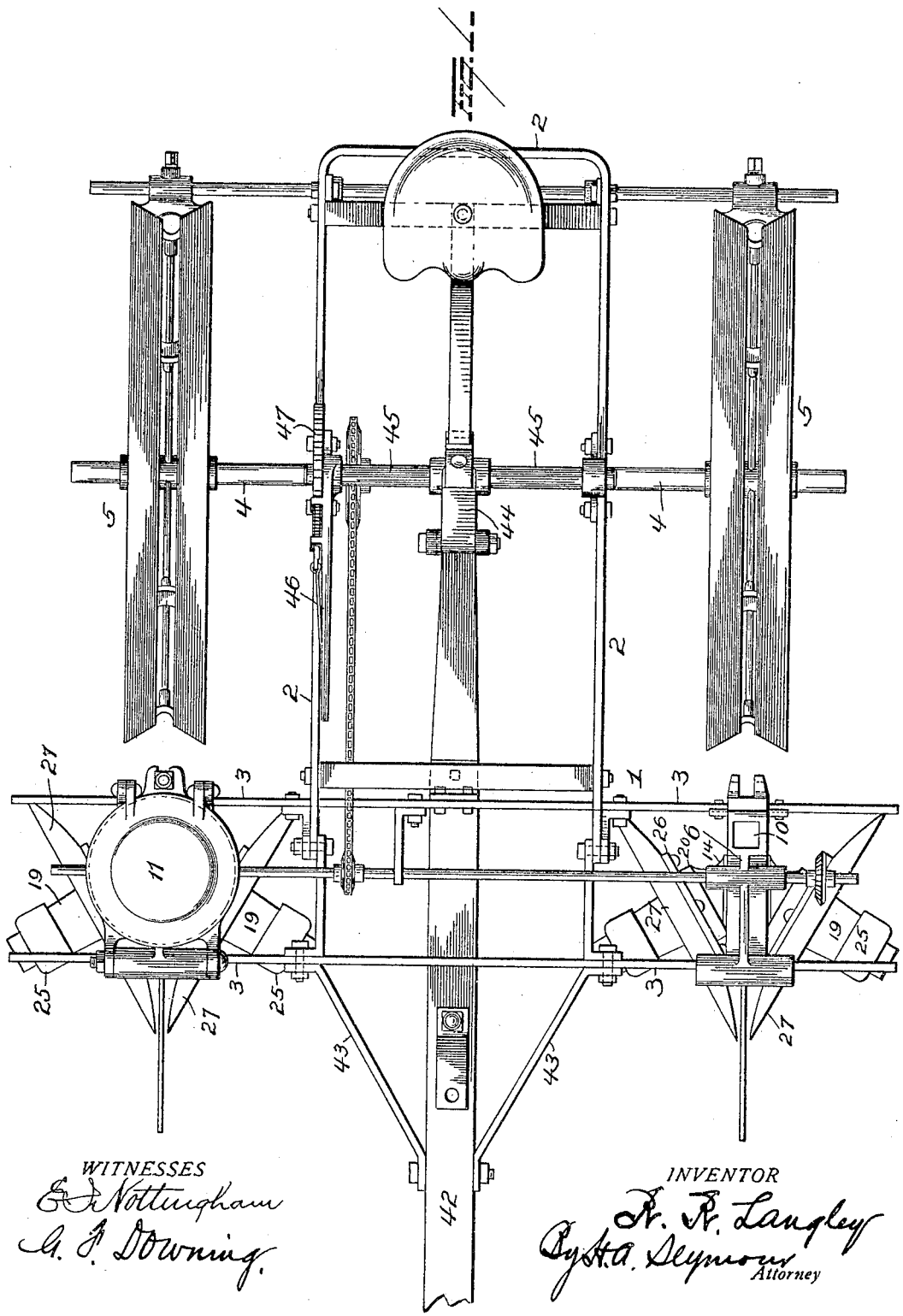

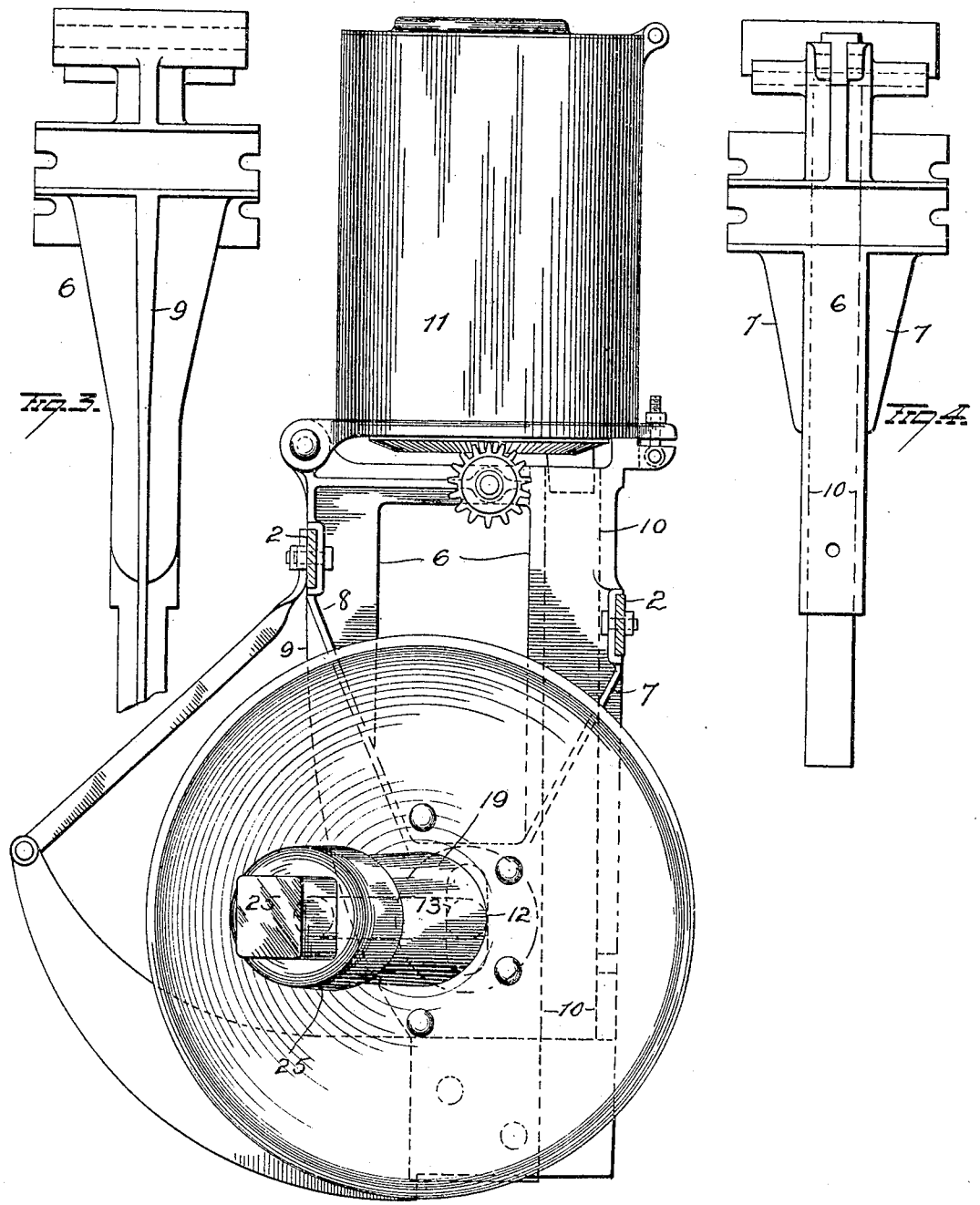

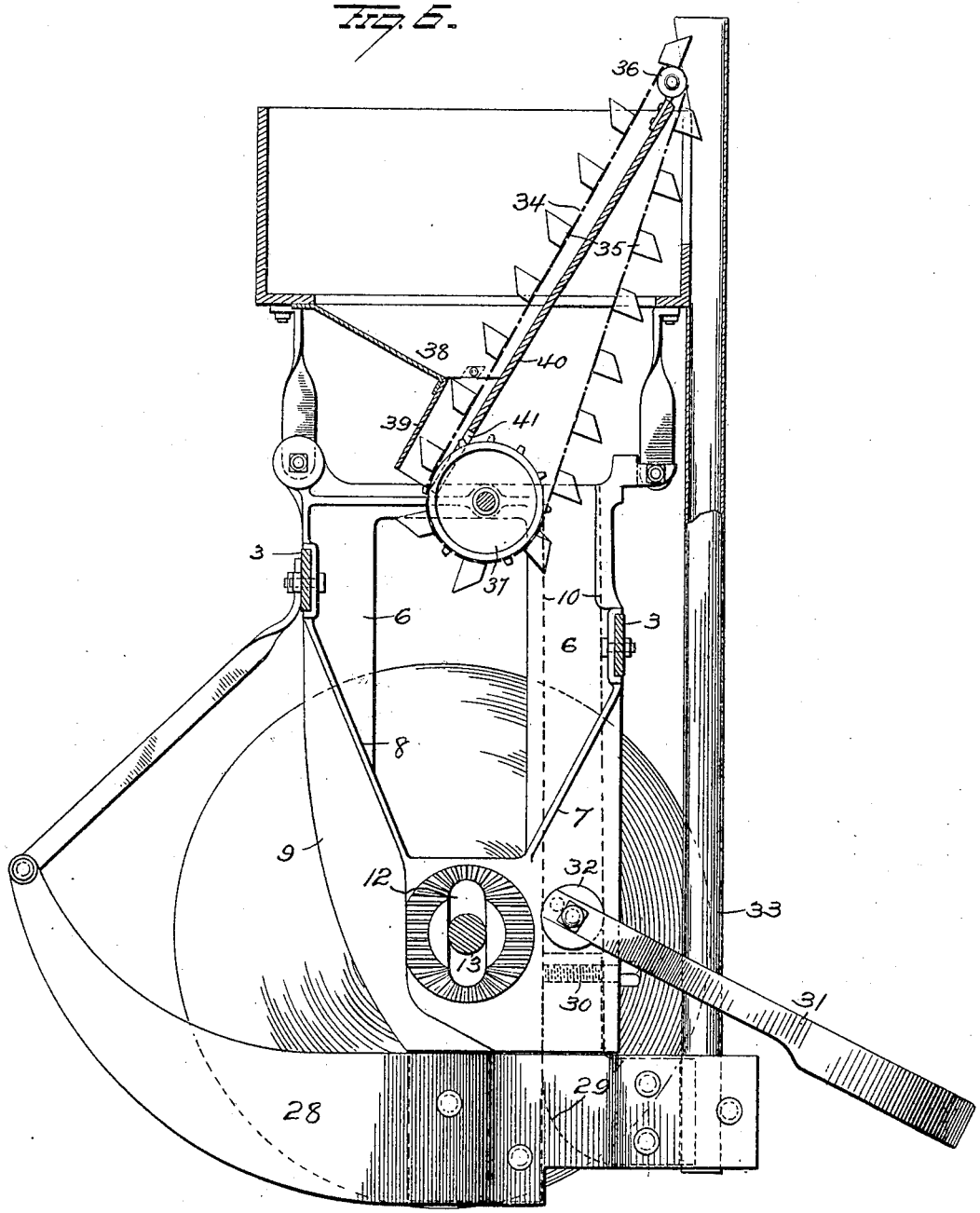

UNITED STATES PATENT OFFICE.

RALPH R. LANGLEY, OF LINCOLN, NEBRASKA.

PLANTING-MACHINE.

No. 927,555. Specification of Letters Patent. Patented July 13, 1909.

Application filed July 8, 1907, Serial No. 382,653. Renewed December 5, 1908. Serial No. 466,164.

*To all whom it may concern:*

Be it known that I, RALPH R. LANGLEY, of Lincoln, in the county of Lancaster and State of Nebraska, have invented certain new and useful Improvements in Planting-Machines; and I do hereby declare the following to be a full, clear, and exact description of the invention, such as will enable others skilled in the art to which it appertains to make and use the same.

My invention relates to an improvement in planters and more particularly to an improved loose ground lister for potatoes or corn,—one object of the invention being to provide simple and efficient means for mounting the furrow-opening disks and permitting their adjustment relatively to the ground and also to regulate the width of the furrow.

A further object is to so construct the mounting for the furrow-opening disks that the latter can be adjusted to regulate the width of furrow by merely turning the supporting axle and so that the depth of planting can be controlled by raising or lowering said axle.

With these objects in view the invention consists in certain novel features of construction and combinations of parts as hereinafter set forth and pointed out in the claims.

In the accompanying drawings, Figure 1 is a plan view of a lister embodying my improvements. Fig. 2 is side elevation, partly in section of the forward portion of the machine, when adapted for planting corn, Figs. 3 and 4 are front and rear views respectively, of the shoe. Fig. 5 is a view in horizontal section showing the mountings for the disks. Fig. 6 is an elevation partly in section illustrating the machine adapted for planting potatoes. Fig. 7 is a rear view of the seed box when the machine is used for planting potatoes, and Fig. 8 is a sectional view on the line *x*—*x* of Fig. 5.

1 represents the framework of the machine, comprising a rectangular longitudinal frame 2 and a front transverse frame 3. An axle 4 is revolubly mounted rearwardly of the center of the frame 2 and has broad faced carrying wheels 5 secured to its respective ends.

Between the members of the transverse frame 3 at points in front of the carrying wheels 5, shoe frames 6 are secured. Each shoe frame 6 comprises an open frame strengthened by ribs 7, 8 and 9, and the rear vertical member of this shoe frame is made tubular to form a duct or passage-way 10 (preferably angular in cross-section) which communicates at its upper end with a seed box 11 mounted upon the shoe and serves to conduct the seed to the furrow. When corn is to be planted any suitable feeding mechanism may be employed for discharging the grains from the seed-box to the duct or passage-way 10 of the shoe frame 6, and an ordinary corn-planter shoe or runner is secured to the lower end of the shoe frame 6.

Each shoe-frame 6 is provided in its lower portion with a vertical, elongated slot 12 through which an axle 13 for carrying furrow-opening disks, passes. This axle is made arch-shaped and so disposed that it will project forwardly at each side of the shoe frame 6, while its intermediate portion can be turned or moved vertically in the elongated slot 12 for the purpose of effecting adjustments as presently explained. On each forwardly projecting member of the axle 13 an axle-box 14 is located and provided with enlarged inner ends 15. The enlarged inner end 15 of each axle-box is made with a beveled face 16, grooved as at 17 to coöperate with the radial ribs arranged around the elongated slot 12 in the shoe frame 6. Nuts 18 are screwed on the forwardly projecting members of the axle and bear against the outer ends of the boxes 14, forcing the latter into locked engagement with the shoe 6. Hubs 19 are mounted to rotate on the axle-boxes 14 and are provided at their inner ends with integral collars 20 which overlap the enlarged portions 15 of said axle-boxes, and between these collars and the portions 15 of the axle-boxes, suitable packing 21 is disposed and held in place in grooves 22 in said portions 15. The hubs 19 are held on by caps 23 slipped over the ends of the axle-members and bearing against the outer ends of the hubs. These caps are prevented from displacement by means of keys 24. A dust proof hard oil cap 25 is screwed on the outer end of each hub and incloses the outer end of the axle and the cap 23. Each hub 19 is provided at its inner end with an annular flange 26 to which a furrow-opening disk 27 is securely bolted.

With the construction and arrangement of parts above described, it will be seen that when the nuts 18, at the ends of the axle-members, are loosened, the axle-box can be disengaged from its locked connection with the shoe frame 6 and the axle raised or lowered in the slot 12 for the purpose of raising or lowering the furrow-opening disk and thus regulating the depth of covering the seed. It will be apparent that when the parts shall have been thus loosened, the axle 12 can be partially rotated so as to alter the angle of its forwardly projecting members to the ground and thus cause the furrow-opening disks to become disposed a greater or less distance apart, at the bottom, thereby regulating the width of the furrow to be cut by said disks and amount of dirt left in bottom of furrow.

When the machine is to be used for planting potatoes a shoe or runner 28 is attached at the lower end of each shoe 6. In effecting this attachment, an angular casting 29 is inserted in the lower end of the corn-chute or passageway 10 and held in place by means of a screw 30, the rearwardly projecting portion of this casting being secured to the shoe or runner 28 and holding the same snugly in place against the rear end of the corn runner. Covering knives 31 for potatoes are also secured to the lower portion of each shoe frame 6 and adjustment of these knives can be effected through the medium of notched clamps 32. A boot 33 is located behind each shoe frame 6, its lower end terminating in the shoe or runner 28 between or behind the furrow-opening disks and its upper end being disposed in position to receive seed potatoes from a conveyer 34. The conveyer 34 comprises a chain with buckets or cups 35 (preferably angular in form). Each conveyer 34 passes over an idler wheel 36 on a shaft disposed over the seed-box and also around a sprocket wheel 37 on a shaft geared to the axle 4 from which it receives motion. Each seed-box is provided with a hopper-bottom 38 terminating at its lower end in a depending narrow extension 39 open at its bottom. The rear wall of the hopper bottom 38 and its extension 39 includes a guide-bar 40 disposed in an inclined position, terminating at its upper end near the idler wheel 36 and provided at its lower end with a slot 41 for the accommodation of the sprocket-wheel 37. The buckets or cups 35 of the conveyer are spaced apart in such manner that there will always be one of said buckets or cups within the narrow extension 39 of the hopper bottom to prevent the escape of potatoes from the open lower end of said extension 29. From this construction and arrangement of parts it will be seen that as the machine moves forward the disks will cut furrows for the reception of potatoes and motion will be transmitted to the conveyer 34 and cause the latter to feed potatoes from the seed-box into the boots 33, by which latter they will be deposited into the furrow—the knives 31 serving to cover them and the carrying wheels serving to press the dirt down on the seed causing quick germination.

A tongue 42 is attached between its ends to the forward portion of the frame work and connected with the transverse frame 3 by means of brace-rods 43. This tongue projects rearwardly to a point slightly in advance of the axle 4 where it is pivotally connected with an arm 44 projecting from a shaft 45 mounted in the frame 2. An operating lever 46 is pivoted to a toothed-segment 47 secured to the frame 2 and provided with a suitable pawl to engage the toothed-segment. The lever 46 is secured to the shaft 45 and provides means for turning the latter to raise the tongue and thus elevate the furrow-opening disks and remove them from the ground, or force them in the ground and regulate the depth of furrow.

A suitable seat for the operator is mounted on the rear end of frame 2.

Numerous slight changes might be made in the details of construction of my invention without departing from the spirit thereof or limiting its scope and hence I do not wish to restrict myself to the precise form and construction of the various details herein set forth.

Having fully described my invention what I claim as new and desire to secure by Letters-Patent, is:—

1. In a planting machine, the combination with a shoe frame of an axle comprising an intermediate portion and end portions rigid with the intermediate portion and projecting at an angle therefrom, said intermediate portion mounted in the shoe frame and capable of being turned, furrow-opening disks carried by the end portions of the axle, and means for rigidly securing said axle at any position to which it may be turned.

2. In a planting machine, the combination with a shoe frame, of an axle having an intermediate portion mounted in the shoe frame and capable of being turned, said axle having end portions rigid with said intermediate portion and projecting forwardly and outwardly therefrom, disks carried by said forwardly and outwardly projecting portions of the axle, and means for securing said axle in a rigid position after it has been turned to adjust the forward edge of the disks relatively to each other.

3. In a planting machine, the combination with a shoe frame provided with a vertically elongated slot, of an axle provided with forwardly projecting end portions and having its intermediate portion passing through said slot and having rotary adjustment therein, furrow-opening disks mounted upon the forwardly projecting portions of the axle, and means for securing said axle at different vertical and rotatable adjustments.

4. In a planting machine, the combination with a shoe frame, of an axle provided with forwardly projecting end portions, the intermediate portion of said axle mounted in the shoe frame, axle-boxes on the forwardly projecting portions of the axle, each of said axle-boxes having a beveled inner end to bear against the shoe frame, means for securing said axle boxes to secure the axle in any position to which the latter may be turned, and furrow opening disks mounted on said axle-boxes.

5. In a planting machine, the combination with a shoe frame, of an axle having its intermediate portion mounted in said shoe frame and having end portions projecting at an angle from said intermediate portion, said end portions having threaded outer ends, axle boxes on the end portions of the axle and provided with beveled inner faces to bear against respective sides of the shoe frame, nuts on the end portions of the axle to bear against the outer ends of the axle-boxes, hubs mounted on the axle-boxes, and disks secured to said hubs.

6. In a planting machine, the combination with a shoe frame, of an axle having forwardly projecting end portions and having its intermediate portion mounted in the shoe frame, axle-boxes on the forwardly projecting portions of the axle and having beveled inner faces to engage the respective sides of the shoe frame, nuts screwed on the forwardly projecting axle portions and bearing against the outer ends of the axle-boxes, hubs mounted on the axle-boxes, caps secured to the axle-members and bearing against the outer ends of the hubs, and furrow-opening disks secured to said hubs.

7. In a planting machine, the combination with a shoe frame, of an axle having forwardly projecting end portions and having its intermediate portion mounted in the shoe frame, axle-boxes on the forwardly projecting portions of the axle and provided with enlarged inner ends having beveled inner faces to bear against respective sides of the shoe frame, means for securing said axle-boxes in place and the axle in any desired adjustment, hubs mounted on the axle-boxes and provided with collars encircling the enlarged portions of the axle-boxes, and furrow opening disks secured to said hubs.

8. In a planter, the combination with the seeding mechanism and the shoe frame, of the two concavo-convex furrow opening disks mounted to have their concave sides turned forward and to have the planes of their cutting edges converge forwardly, the front parts of their cutting edges lying relatively closely together, and adapted to have the said approaching parts of their cutting edges adjustable vertically relatively to the ground surface around an axis, and means for adjusting the disks bodily vertically, substantially as set forth.

9. In a planter, the combination with the frame and the seed delivering mechanism, of two concavo-convex furrow opening disks, one on each side of the longitudinal vertical plane of the point of seed delivery, having their concave faces turned forward, and both arranged homologously relatively to said plane and to the surface of the ground, and having the planes of their cutting edges simultaneously adjustable relatively to horizontal planes, whereby said disks can be caused to cut furrows of varying widths and varying depths while held in homologous positions relatively to the said vertical plane.

In testimony whereof, I have signed this specification in the presence of two subscribing witnesses.

RALPH R. LANGLEY.

Witnesses:
CLAUDE S. WILSON,
BELVA G. JONES.